(12) United States Patent
Okamoto et al.

(10) Patent No.: US 11,198,187 B2
(45) Date of Patent: Dec. 14, 2021

(54) OIL HOLE REAMER

(71) Applicants: Sumitomo Electric Tool Net, Inc., Osaka (JP); SUMITOMO ELECTRIC HARDMETAL CORP., Itami (JP)

(72) Inventors: Jun Okamoto, Osaka (JP); Futoshi Takeshita, Osaka (JP); Kyosuke Kai, Kashiba (JP); Katsutoshi Fukuda, Kashiba (JP); Masashi Yamada, Itami (JP)

(73) Assignees: Sumitomo Electric Tool Net, Inc., Osaka (JP); SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 16/958,350

(22) PCT Filed: Oct. 16, 2019

(86) PCT No.: PCT/JP2019/040642
§ 371 (c)(1),
(2) Date: Jun. 26, 2020

(87) PCT Pub. No.: WO2020/080397
PCT Pub. Date: Apr. 23, 2020

(65) Prior Publication Data
US 2021/0060675 A1    Mar. 4, 2021

(30) Foreign Application Priority Data
Oct. 18, 2018   (JP) .............................. JP2018-196486

(51) Int. Cl.
*B23D 77/00*   (2006.01)

(52) U.S. Cl.
CPC ...... *B23D 77/006* (2013.01); *B23D 2277/205* (2013.01); *B23D 2277/62* (2013.01)

(58) Field of Classification Search
CPC .......................... B23D 77/006; B23D 2277/60
See application file for complete search history.

(56) References Cited

U.S. PATENT DOCUMENTS

| | | | | |
|---|---|---|---|---|
| 5,178,497 A * | 1/1993 | Kitabayashi | ........... | B23D 77/00 408/145 |
| 5,238,335 A * | 8/1993 | Nomura | ................. | B23D 77/02 408/199 |
| 8,272,815 B2 * | 9/2012 | Takiguchi | .............. | B23D 77/00 408/144 |

(Continued)

FOREIGN PATENT DOCUMENTS

| | | | | |
|---|---|---|---|---|
| CN | 206747715 U | 12/2017 | | |
| DE | 102006043616 A1 * | 5/2008 | ............ | B23D 77/02 |

(Continued)

*Primary Examiner* — Eric A. Gates
(74) *Attorney, Agent, or Firm* — Faegre Drinker Biddle & Reath LLP (57) ABSTRACT

An oil hole reamer includes an oil passage extending inside a tool main body along an axis of the tool main body, and an oil hole extending radially outward from the oil passage to an outer circumference of the tool main body. An oil outlet of the oil hole is formed to be open toward a position corresponding to a corner at which a tip cutting edge intersects an outer-circumference cutting edge and to cause at least part of the oil outlet to be open to the outer-circumference flank face.

4 Claims, 11 Drawing Sheets

(56) References Cited

U.S. PATENT DOCUMENTS

| | | | |
|---|---|---|---|
| 9,999,932 B2 * | 6/2018 | Luik | .................... B23C 5/28 |
| 10,486,253 B2 * | 11/2019 | Ning | .................... B23D 77/02 |
| 2016/0001381 A1 | 1/2016 | Lach | |

FOREIGN PATENT DOCUMENTS

| | | |
|---|---|---|
| DE | 102014109390 A1 | 1/2016 |
| JP | S49-148591 U | 12/1974 |
| JP | S53-27293 U | 3/1978 |
| JP | S56-28817 U | 3/1981 |
| JP | S64-20221 U | 2/1989 |
| JP | H06-017825 U | 3/1994 |
| JP | 2000-263328 A | 9/2000 |

\* cited by examiner

OIL HOLE REAMER

TECHNICAL FIELD

The present disclosure relates to an oil hole reamer. The present application claims the priority of Japanese Patent Application No. 2018-196486 filed on Oct. 18, 2018, the entire contents of which are incorporated by reference.

BACKGROUND ART

A reamer is used as a cutting tool that finishes the inner circumference of a pilot hole formed in advance in a workpiece material with a drill or the like to have accurate dimensions (e.g., PTLs 1 and 2).

In order to lubricate a portion between the workpiece material and the reamer, the reamer disclosed in each of PTLs 1 and 2 has an oil passage extending along the axis inside a tool main body and an oil hole extending radially outward from the oil passage to the outer circumference of the tool main body. Herein, an oil outlet of the oil hole is formed to be open toward an inner surface (groove bottom surface) of a groove on the outer circumference of the tool main body, and cutting oil discharged through this oil hole passes through the groove on the outer circumference of the tool main body to lubricate an outer-circumference cutting edge and a tip cutting edge.

CITATION LIST

Patent Literature

PTL 1: Japanese Patent Laying-Open No. 2000-263328
PTL 2: Japanese Utility Model Laying-Open No. 06-17825

SUMMARY OF INVENTION

An oil hole reamer according to an embodiment of the present disclosure includes:

a tool main body that rotates about an axis;

a groove extending axially on an outer circumference of the tool main body to an axially front end of the tool main body;

a margin formed on the outer circumference of the tool main body while being adjacent to a tool-rotation-direction back side of the groove;

an outer-circumference flank face formed on the outer circumference of the tool main body while being adjacent to a tool-rotation-direction back side of the margin, the outer-circumference flank face having a smaller diameter at a tool-rotation-direction back than at a tool-rotation-direction front;

an outer-circumference cutting edge formed at an intersecting ridge between the margin and the groove;

a tip flank face formed adjacent to an axially front side of the margin and having a smaller diameter at an axial front than at an axial back;

a tip cutting edge formed at an intersecting ridge between the tip flank face and the groove and connected with an axially front end of the outer-circumference cutting edge;

an oil passage extending along the axis of the tool main body inside the tool main body; and an oil hole extending radially outward from the oil passage to the outer circumference of the tool main body, wherein an oil outlet of the oil hole is formed to be open toward a position corresponding to a corner at which the tip cutting edge intersects the outer-circumference cutting edge and to cause at least part of the oil outlet to be open to the outer-circumference flank face.

DETAILED DESCRIPTION

[Problem to be Solved by the Present Disclosure]

The inventors of the present application have advanced the development of a reamer in-house that can finish the inner circumference of a pilot hole with a high degree of accuracy even when high-feed machining (machining with an axially moving amount per rotation of a tool which is set relatively high) is performed. Then, the inventors have produced a sample oil hole reamer in which an oil hole through which cutting oil is discharged is formed at a position as close to the axially front end of the tool main body as possible in order to effectively lubricate and cool the corner at which the tip cutting edge intersects the outer-circumference cutting edge.

Specifically, the inventors have produced a sample oil hole reamer in-house in which an oil hole is open to a groove bottom surface in a portion of the groove extending axially on the outer circumference of the tool main surface, which is as close to the axially front end of the tool main body as possible, and the corner at which the tip cutting edge intersects the outer-circumference cutting edge is lubricated and cooled with cutting oil discharged through the oil hole, and then, assessed the performance of the oil hole reamer.

The inventors have found that a hole with a sufficient degree of accuracy is not obtained in some cases when the sample oil hole reamer is used and the inner circumference of the pilot hole is finished by high-feed machining. The cause of this is considered as follows.

Figure 11:
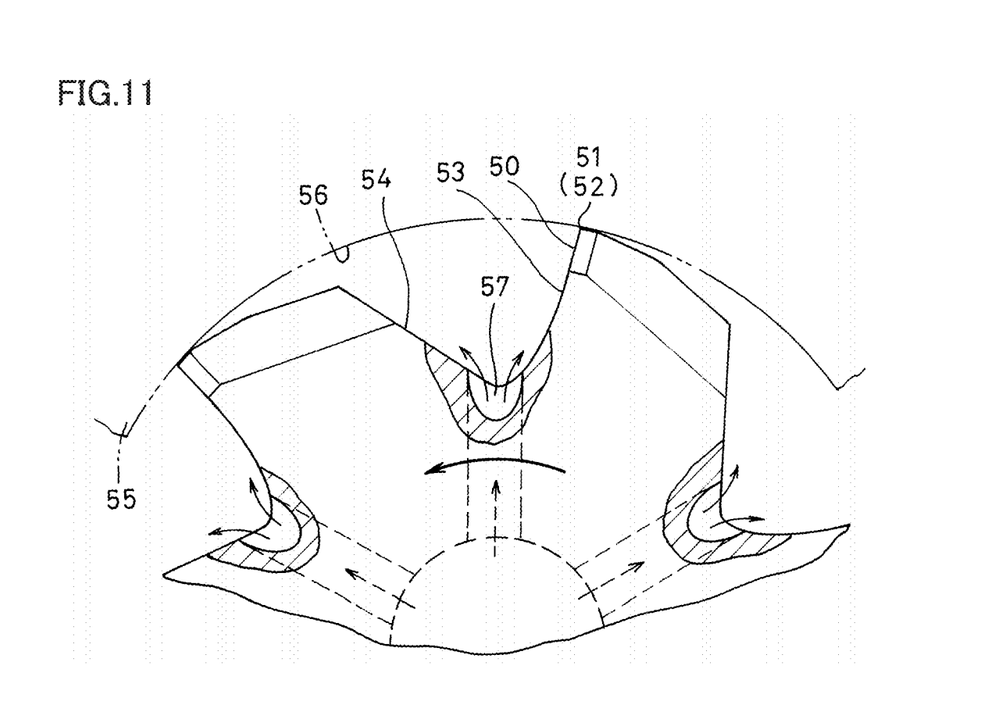
FIG. 11 shows an oil hole reamer of a comparative example in correspondence with FIGS. 8 and 9.

When a reamer is inserted into a pilot hole of a workpiece material while being rotated, as shown in FIG. 11, the inner circumference of the pilot hole is cut by a corner 52 at which a tip cutting edge 50 intersects an outer-circumference cutting edge 51 that extends axially, causing chips. These chips are moved from corner 52 along a rake face 53 toward a groove bottom of a groove 54, and grow spirally in a space surrounded by the inner surface of groove 54 and the inner surface of a hole 56 of a workpiece material 55, and are then discharged. In this regard, the following has been found. When the cutting oil is discharged through an oil hole 57, which is open to the groove bottom surface of groove 54, a flow of the cutting oil discharged through oil hole 57 hinders the movement of the chips from corner 52 along rake face 53 toward the groove bottom of groove 54, preventing smooth discharge of the chips. Consequently, the chips rotate at high speed together with the reamer while interfering with the inner surface (finished surface) of a hole 56 of workpiece material 55, which may cause roughness of the inner surface of hole 56.

Therefore, an object is to provide an oil hole reamer capable of finishing the inner circumference of a pilot hole with a high degree of accuracy even when high-feed machining is performed.

[Advantageous Effect of the Present Disclosure]

According to the above, an oil hole reamer can be provided that can finish the inner circumference of a pilot hole with a high degree of accuracy even when high-feed machining is performed.

Description of Embodiments of the Present Disclosure (1) An oil hole reamer according to an aspect of the present disclosure includes:

a tool main body that rotates about an axis;

a groove extending axially on an outer circumference of the tool main body to an axially front end of the tool main body;

a margin formed on the outer circumference of the tool main body while being adjacent to a tool-rotation-direction back side of the groove;

an outer-circumference flank face formed on the outer circumference of the tool main body while being adjacent to a tool-rotation-direction back side of the margin, the outer-circumference flank face having a smaller diameter at a tool-rotation-direction back than at a tool-rotation-direction front;

an outer-circumference cutting edge formed at an intersecting ridge between the margin and the groove;

a tip flank face formed adjacent to an axially front side of the margin and having a smaller diameter at an axial front than at an axial back;

a tip cutting edge formed at an intersecting ridge between the tip flank face and the groove and connected with an axially front end of the outer-circumference cutting edge;

an oil passage extending along the axis of the tool main body inside the tool main body; and an oil hole extending radially outward from the oil passage to the outer circumference of the tool main body, wherein an oil outlet of the oil hole is formed to be open toward a position corresponding to a corner at which the tip cutting edge intersects the outer-circumference cutting edge and to cause at least part of the oil outlet to be open to the outer-circumference flank face.

With this configuration, since the oil outlet of the oil hole is open toward the position corresponding to the corner at which the tip cutting edge intersects the outer-circumference cutting edge, even when high-feed machining is performed, the corner at which the tip cutting edge intersects the outer-circumference cutting edge can be effectively lubricated and cooled with the cutting oil discharged through the oil hole. The cutting oil discharged through the oil hole spreads in the form of a film along the inner surface of the hole of the workpiece material from the gap between the outer-circumference flank face and the inner circumference of the hole of the workpiece material, so that the cutting oil lubricates and cools the portion at the corner at which the tip cutting edge intersects the outer-circumference cutting edge. At this time, a flow of the cutting oil spreading in the form of a film from the gap between the outer-circumference flank face and the inner circumference of the hole of the workpiece material does not hinder the movement of the chips toward the groove bottom of the groove from the corner at which the tip cutting edge intersects the outer-circumference cutting edge. Consequently, the chips are discharged smoothly, allowing the inner circumference of the pilot hole to be finished with a high degree of accuracy.

(2) Preferably, the oil hole is a hole extending obliquely to a direction perpendicular to the axis inside the tool main body.

With this configuration, the cutting oil that has been discharged through the oil hole and collided with the inner circumference of the hole of the workpiece material easily spreads to the axial front. This enables effective lubrication and cooling of the corner at which the tip cutting edge intersects the outer-circumference cutting edge when high-feed machining is performed.

(3) Preferably, the oil outlet is open across the outer-circumference flank face and an inner surface of the groove.

With this configuration, a relatively large space is defined between the oil outlet of the oil hole and the inner surface of the hole of the workpiece material, allowing a sufficient amount of cutting oil to be discharged through the oil outlet of the oil hole. This enables particularly effective lubrication and cooling of the corner at which the tip cutting edge intersects the outer-circumference cutting edge.

(4) Preferably, the outer-circumference cutting edge is a straight edge extending parallel to the axis of the tool main body or a right-hand helical edge twisted at an angle of 10° or less clockwise from an axial back to an axial front.

With this configuration, the cutting resistance of the pilot hole of the workpiece material can be minimized, allowing the inner circumference of the pilot hole to be finished at a particularly high degree of accuracy.

(5) An oil hole reamer according to an aspect of the present disclosure includes:

a tool main body that rotates about an axis;

a groove extending axially on an outer circumference of the tool main body to an axially front end of the tool main body;

a margin formed on the outer circumference of the tool main body while being adjacent to a tool-rotation-direction back side of the groove;

an outer-circumference flank face formed on the outer circumference of the tool main body while being adjacent to a tool-rotation-direction back side of the margin, the outer-circumference flank face having a smaller diameter at a tool-rotation-direction back than at a tool-rotation-direction front;

an outer-circumference cutting edge formed at an intersecting ridge between the margin and the groove;

a tip flank face formed adjacent to an axially front side of the margin and having a smaller diameter at an axial front than at an axial back;

a tip cutting edge formed at an intersecting ridge between the tip flank face and the groove and connected with an axially front end of the outer-circumference cutting edge;

an oil passage extending along the axis of the tool main body inside the tool main body; and an oil hole extending radially outward from the oil passage to the outer circumference of the tool main body, wherein an oil outlet of the oil hole is formed to be open toward a position corresponding to a corner at which the tip cutting edge intersects the outer-circumference cutting edge and to cause at least part of the oil outlet to be open to the outer-circumference flank face, the oil hole is a hole extending obliquely to a direction perpendicular to the axis inside the tool main body, the oil outlet is open across the outer-circumference flank face and an inner surface of the groove, and the outer-circumference cutting edge is a straight edge extending parallel to the axis of the tool main body or a right-hand helical edge twisted at an angle of 10° or less clockwise from an axial back to an axial front.

Description of Embodiments

Specific examples of an oil hole reamer according to an embodiment of the present disclosure will now be described with reference to the drawings. It should be noted that the present invention is not limited to these examples but is defined by the scope of the claims, and is intended to include any modifications within the scope and meaning equivalent to the scope of the claims.

Figure 1:
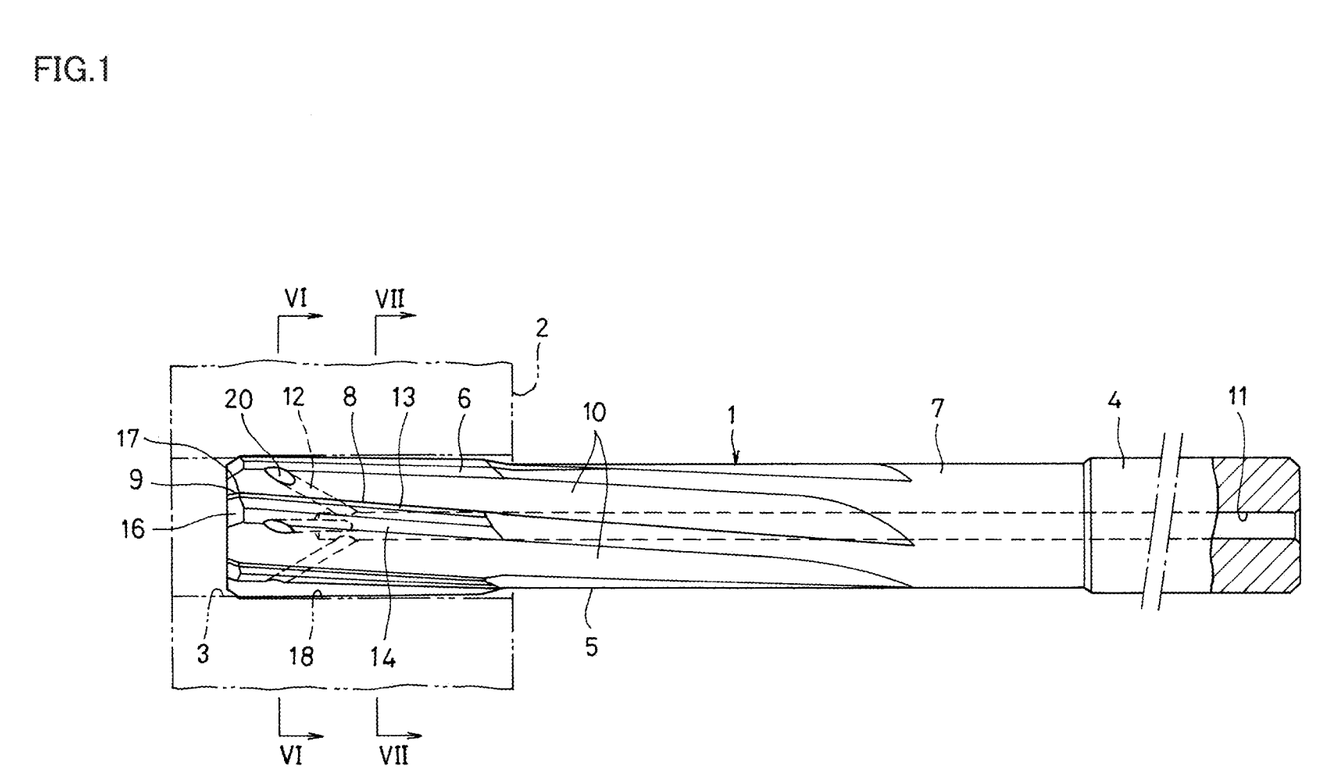
FIG. 1 is a partial sectional view of an oil hole reamer according to an embodiment of the present disclosure.

FIG. 1 shows an oil hole reamer 1 (hereinafter, merely referred to as "reamer 1") according to an embodiment of the present disclosure. Reamer 1 is a cutting tool that advances axially while rotating to cut an inner circumference of a pilot hole 3 formed in advance in a workpiece material 2, thereby finishing the inner circumference of pilot hole 3 with smoothness and accurate dimensions.

Reamer 1 includes a shank 4 attached to the main shaft of a machine tool (not shown) and a tool main body 5 provided continuously with and axially in front of shank 4. With reference to the figure, shank 4 is a cylindrical straight shank. Tool main body 5 is a rod-shaped part including a cutting edge portion 6 and a neck portion 7 that rotate about an axis shared by shank 4 and tool main body 5 as shank 4 rotates. Cutting edge portion 6 is a portion including an outer-circumference cutting edge 8 and a tip cutting edge 9, which will be described below, and neck portion 7 has an outer diameter smaller than that of cutting edge portion 6. Neck portion 7 is formed between cutting edge portion 6 and shank 4. Reamer 1 is integrally formed of cemented carbide. Cutting edge portion 6 of reamer 1 may be a replaceable part formed of cemented carbide.

Grooves 10, extending axially to the axially front end of tool main body 5, are formed on the outer circumference of tool main body 5. The axially front end of groove 10 is open to an axially front end face of cutting edge portion 6, and the axially back end of groove 10 is cut upward at some midpoint of neck portion 7. An oil passage 11, extending along the axis of tool main body 5, and oil holes 12, extending axially outward from oil passage 11 to the outer circumference of tool main body 5, are formed inside tool main body 5. The axially back end of oil passage 11 is open to the axially back end face of shank 4, and the axially front end of oil passage 11 stays inside cutting edge portion 6 so as not to be open to the axially front end face of cutting edge portion 6.

Figure 2:
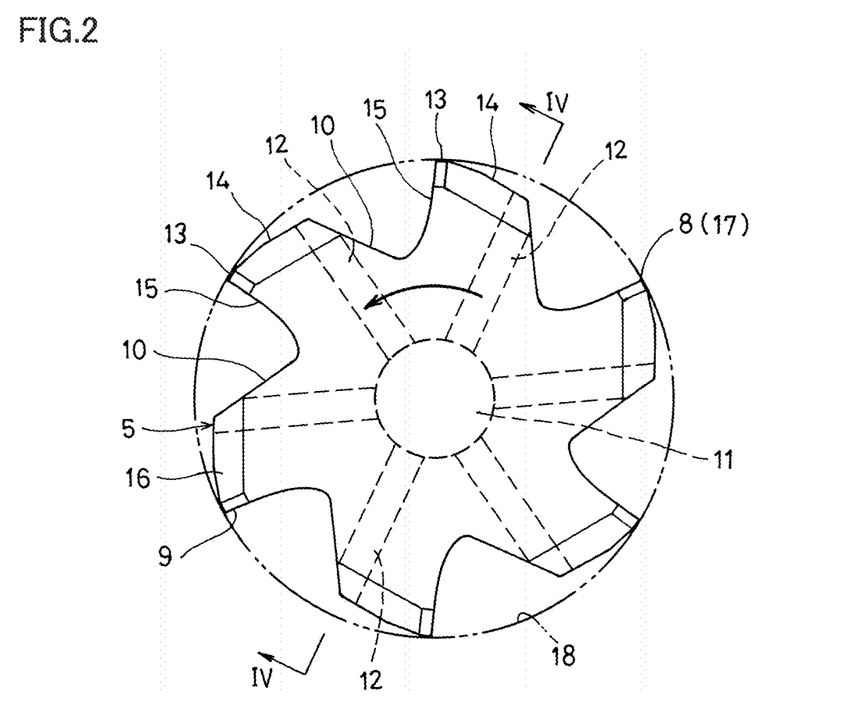
FIG. 2 shows the oil hole reamer of FIG. 1, which is seen from an axially front end face side.

As shown in FIG. 2, grooves 10 on the outer circumference of tool main body 5 are spaced circumferentially. Groove 10 is formed such that a sectional shape thereof perpendicular to the axis has a smooth concave curve shape without any ridgeline (a boundary at which an angle of inclination changes suddenly). Specifically, groove 10 is formed such that a sectional shape of groove 10, which is obtained by cutting tool main body 5 along a virtual surface perpendicular to the axis, is entirely formed of a concave curve or of a concave curve and straight lines smoothly connecting with the concave cure.

A margin 13 having a cylindrical shape, which is adjacent to a tool-rotation-direction back side of groove 10, and an outer-circumference flank face 14, which has a diameter gradually decreasing from margin 13 toward the tool-rotation-direction back of the tool, are formed on the outer circumference of tool main body 5. The tool-rotation-direction back end of outer-circumference flank face 14 is continuous with groove 10. A rake face 15 is formed in the inner surface of groove 10.

Figure 3:
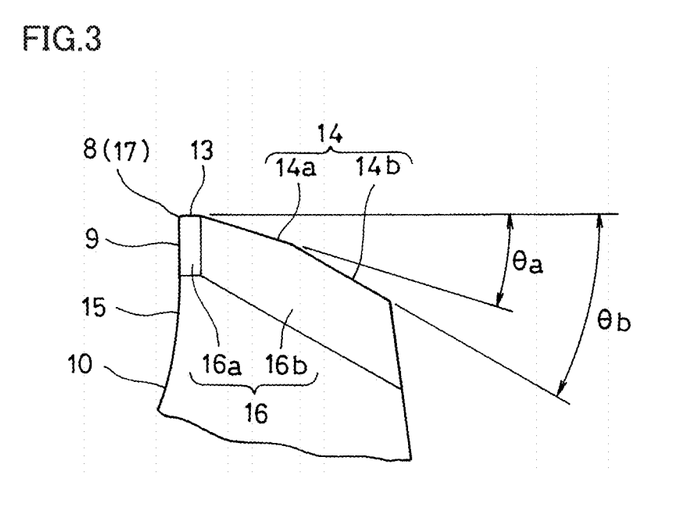
FIG. 3 shows one land of a plurality of lands (a portion sandwiched between grooves circumferentially adjacent to each other) shown in FIG. 1 in an enlarged manner.
Figure 5:
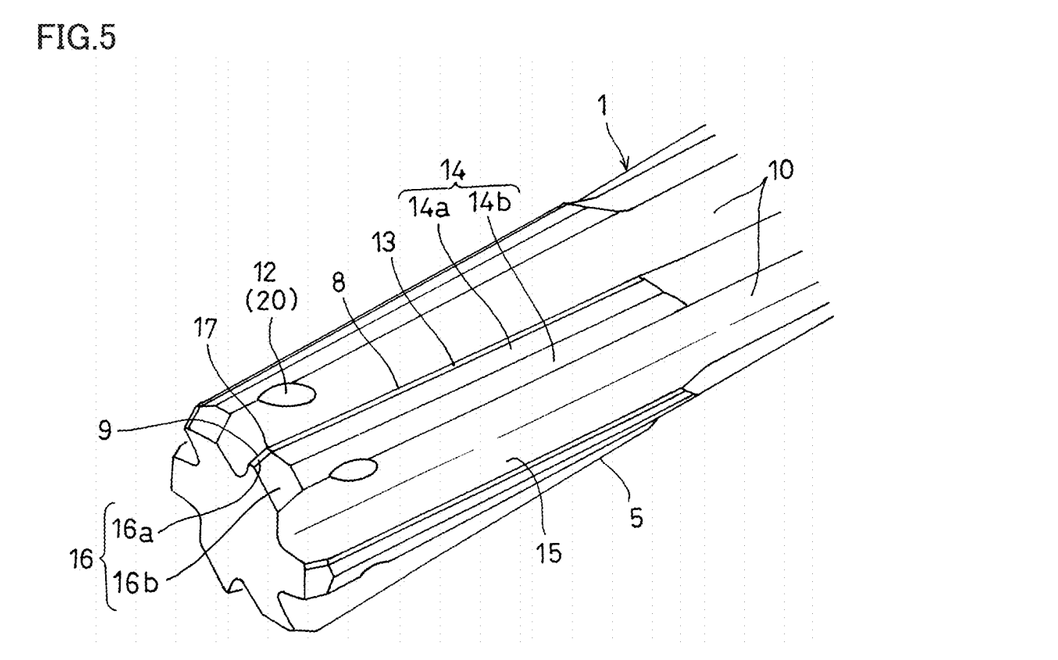
FIG. 5 is a perspective view of a cutting edge portion of the oil hole reamer of FIG. 1.

As shown in FIG. 3, rake face 15 is a portion of the inner surface of groove 10, which faces the tool-rotation-direction front, and is a face continuous with outer-circumference cutting edge 8 and tip cutting edge 9 (see FIG. 5). Margin 13 is a cylindrical surface without any relief. Outer-circumference flank face 14 is formed of a second flank face 14a, which has a second relief angle θa, and a third flank face 14b, which has a third flank face θb larger than second relief angle θa, in order from margin 13 toward the tool-rotation-direction back. Third flank face 14b is continuous with groove 10 having a larger angle.

Margin 13 is a cylindrical surface with an outer diameter that is constant axially. Herein, an outer diameter being constant axially does not necessarily mean being constant in a mathematically strict sense and means including a back taper (a minute inclination at which the outer diameter decreases at a rate of 0.02 mm or more and 0.10 mm or less per axial length of 100 mm from the axial front toward the axial back) for a reduced cutting resistance of the reamer. The inclination of the back taper is set to magnitude with which the outer diameter changes at a rate of approximately 0.03 mm per axial length of 100 mm and has an upper limit of approximately 0.04 mm in a common reamer, whereas in reamer 1 of the present embodiment, the inclination of the back taper is set to magnitude with which the outer diameter changes at a rate of 0.05 mm or more (preferably 0.06 mm or more) and 0.10 mm or less per axial length of 100 mm in order to support high-feed machining.

As shown in FIGS. 1 and 5, outer-circumference cutting edge 8 is formed at the intersecting ridge between margin 13 and groove 10. Outer-circumference cutting edge 8 is a right-hand helical edge twisted at an angle of more than 0° and 10° or less (preferably, 2° or more and 8° or less, more preferably 3° or more and 7° or less) clockwise from the axial back toward the axial front. Herein, an angle of torsion of outer-circumference cutting edge 8 is an angle formed by outer-circumference cutting edge 8 with respect to a straight line parallel to the axis of tool main body 5. Although the case in which outer-circumference cutting edge 8 is the right-hand helical edge is shown in the figure, outer-circumference cutting edge 8 may be a straight edge extending parallel to the axis of tool main body 5 for a reduced manufacturing cost of reamer 1. The cutting resistance of reamer 1 can be reduced also in this manner.

A tip flank face 16, which has a diameter gradually decreasing from margin 13 toward the axial front, is adjacently formed on the axial front side of margin 13. As shown in FIG. 3, tip flank face 16 is formed of a tip second face 16a and a tip third face 16b, which is adjacent to the toolrotation-direction back side of tip second face 16a. The tip relief angle of tip third face 16b is larger than the tip relief angle of tip second face 16a.

As shown in FIG. 5, tip cutting edge 9 is formed at the intersecting ridge between tip flank face 16 (tip second face 16a) and groove 10. The radially outer end of tip cutting edge 9 is connected with the axially front end of outer-circumference cutting edge 8. A corner 17, at which tip cutting edge 9 intersects outer-circumference cutting edge 8, is shown as a corner 17 where tip cutting edge 9 intersects outer-circumference cutting edge 8 at one point, which may be a corner 17 at which tip cutting edge 9 intersects outer-circumference cutting edge 8 in the shape of an arc.

Figure 4:
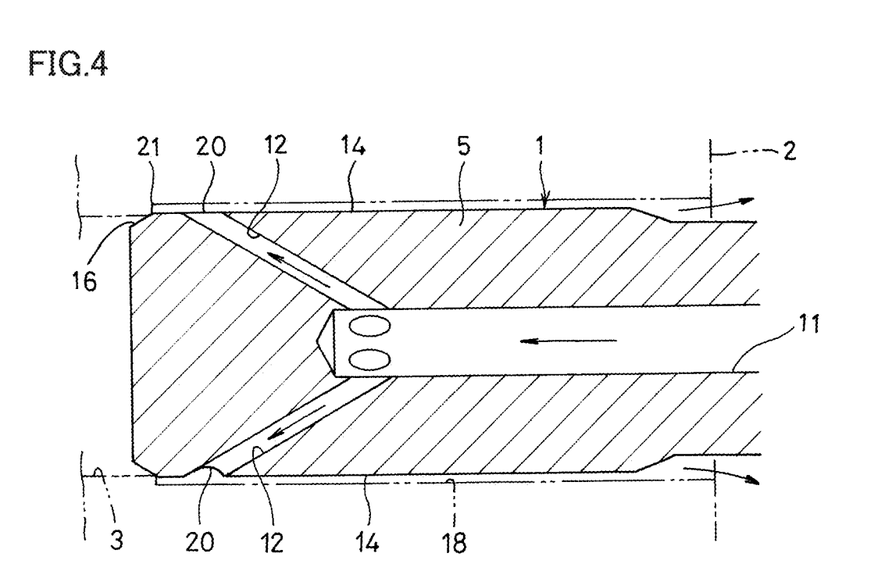
FIG. 4 is a sectional view taken along the line IV-IV of FIG. 2.

As shown in FIG. 4, the radially inner end of oil hole 12 is in communication with oil passage 11. The radially outer end of oil hole 12 is open to the outer circumference of tool main body 5, thereby forming an oil outlet 20. Oil outlet 20 is open to outer-circumference flank face 14 on the outer circumference of tool main body 5. Oil passage 11 and oil hole 12 are supplied with cutting oil through an opening of oil passage 11 which is located on the axially back end face of shank 4 (see FIG. 1). The cutting oil may be a water-soluble cutting oil (emulsion, soluble, solution) or a water-insoluble cutting oil.

Oil hole 12 is a hole extending obliquely to a direction perpendicular to the axis inside tool main body 5 such that the cutting oil is discharged from outer-circumference flank face 14 to the axial front. The angle formed by oil hole 12 with respect to the axis of tool main body 5 is set in the range of 5° or more to 45° or less (preferably, 20° or more to 35° or less). Oil outlet 20 of oil hole 12 is open toward a position corresponding to corner 17 (see FIG. 5). Herein, oil outlet 20 of oil hole 12 being open toward a position corresponding to corner 17 means that oil outlet 20 is located at a position at which a position 21 (see FIG. 4), which is concyclic with corner 17 (see FIG. 5) where tip cutting edge 9 intersects outer-circumference cutting edge 8, can be directly lubricated with the cutting oil discharged through oil outlet 20, specifically means that in the cross-section including the axis, assuming a region obtained by extending oil hole 12 outwardly in the direction in which oil hole 12 extends, oil hole 12 is provided such that position 21 (see FIG. 4) concyclic with corner 17 (see FIG. 5) is included in this region or in the range of 5 mm or less (preferably 3 mm or less) toward the axial front from this region.

Figure 6:
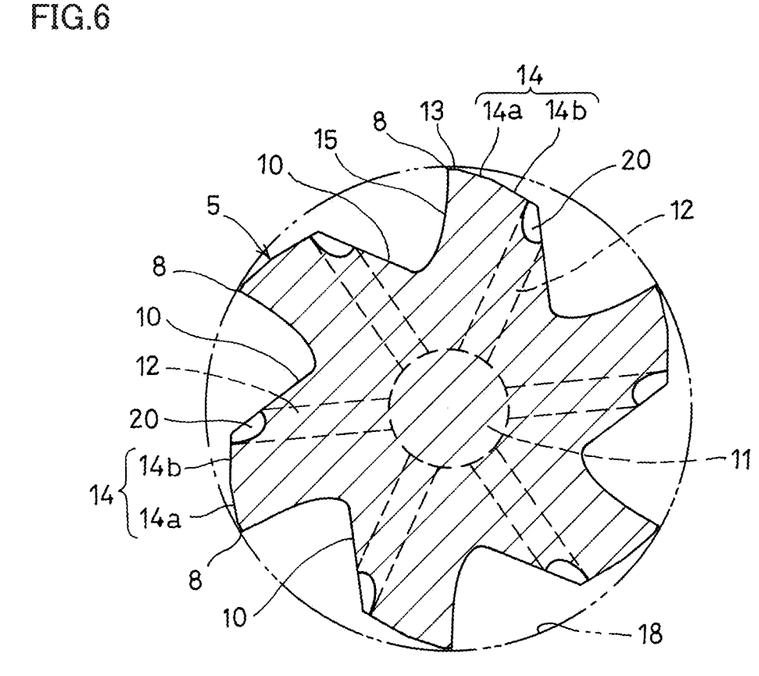
FIG. 6 is a sectional view taken along the line VI-VI of FIG. 1.

As shown in FIG. 6, oil outlet 20 of oil hole 12 is formed such that at least part of oil outlet 20 is open into the plane of outer-circumference flank face 14. Specifically, oil outlet 20 of oil hole 12 is arranged at the tool-rotation-direction back end of outer-circumference flank face 14 to be open across outer-circumference flank face 14 and the inner surface of groove 10. That is to say, the tool-rotation-direction back portion of outer-circumference flank face 14 and the tool-rotation-direction front portion of the inner surface of groove 10 form a projecting ridgeline that projects radially outwardly, and oil hole 12 is open on the projecting ridgeline.

An example use of oil hole reamer 1 will be described. As shown in FIG. 1, when reamer 1 is inserted into pilot hole 3 of workpiece material 2 while being rotated, the inner circumference of pilot hole 3 is cut by corner 17 shown in FIG. 5, so that the inner circumference of pilot hole 3 is finished smoothly. Herein, oil outlet 20 of oil hole 12 is open toward the position corresponding to corner 17 as shown in FIG. 4, and accordingly, reamer 1 can effectively lubricate and cool corner 17 shown in FIG. 5 with the cutting oil discharged through oil hole 12 even when high-feed machining (machining in which an axially moving amount per rotation of a tool is set relatively large) is performed. When workpiece material 2 is made of carbon steel, the feed amount in the axis direction per rotation of reamer 1 is 0.05 mm or more and 0.15 mm or less and the cutting speed (the circumferential speed on the outer circumference of the reamer) is 15 m/min or more and 30 m/min or less in common machining, whereas in high-feed machining, the feed rate in the axial direction per rotation of reamer 1 is set within the range of 0.3 mm or more to 1.8 mm or less, and the cutting speed is set within the range of 60 m/min or more to 180 m/min or less.

Figure 8:
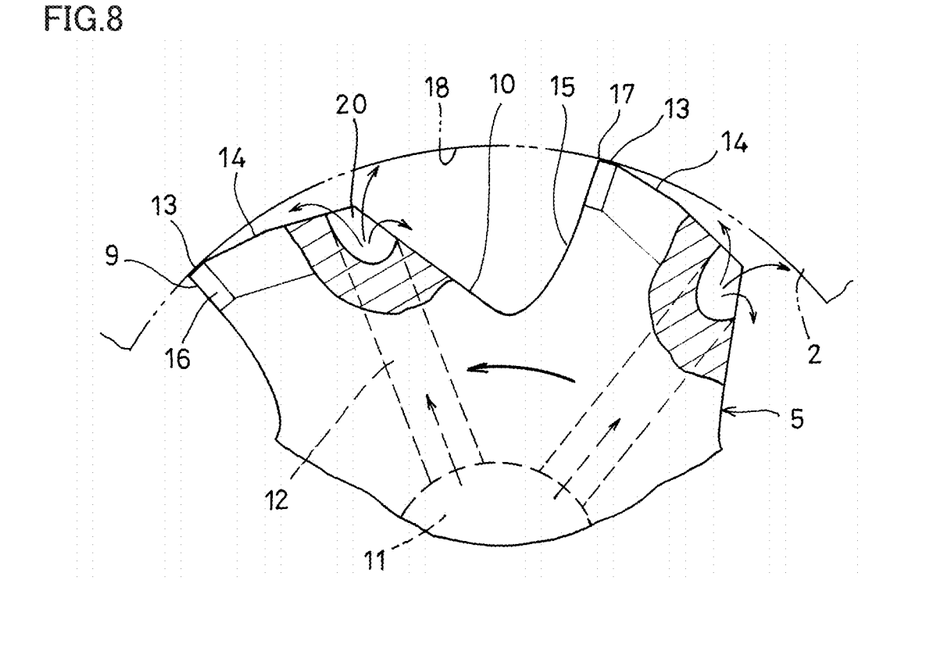
FIG. 8 is a partial sectional view showing how the inner circumference of a pilot hole of a workpiece material is cut while discharging cutting oil through the oil hole of the oil hole reamer of FIG. 1.

As shown in FIG. 8, chips generated when workpiece material 2 is cut at corner 17 move from corner 17 along rake face 15 toward the groove bottom of groove 10, and grow spirally in the space surrounded by the inner surface of groove 10 and the inner surface of a hole 18 (a hole finished by cutting the inner circumference of pilot hole 3) of workpiece material 2, thereby being discharged to the axial back. Herein, the cutting oil discharged through oil hole 12 spreads in the form of a film from a gap between outer-circumference flank face 14 and the inner circumference of hole 18 of workpiece material 2 along the inner surface of hole 18 of workpiece material 2, and the cutting oil lubricates and cools corner 17. At this time, a flow of the cutting oil spreading in the form of a film from the gap between outer-circumference flank face 14 and the inner circumference of hole 18 of workpiece material 2 does not hinder the movement of the chips from corner 17 toward the groove bottom of groove 10. Consequently, the chips are discharged smoothly, and even when high-feed machining is performed, the inner circumference of pilot hole 3 can be finished with a high degree of accuracy.

In reamer 1, since oil outlet 20 of oil hole 12 is open to outer-circumference flank face 14, the cutting oil discharged through oil hole 12 spreads in the form of a film along the inner surface of hole 18 of workpiece material 2, and the cutting oil washes outer-circumference flank face 14. This can prevent accumulation of fine powder of workpiece material 2 at the end of outer-circumference flank face 14 on the margin 13 side, thus preventing roughness of the inner surface of hole 18 due to the fine powder of workpiece material 2.

Since reamer 1 employs oil hole 12 extending obliquely to the direction perpendicular to the axis inside tool main body 5 such that the cutting oil is discharged from outer-circumference flank face 14 to the axial front, the cutting oil that has been discharged through oil hole 12 and collided with the inner circumference of hole 18 of workpiece material 2 easily spreads to the axial front. This can effectively lubricate and cool corner 17 at which tip cutting edge 9 intersects outer-circumference cutting edge 8 when high-feed machining is performed.

Figure 9:
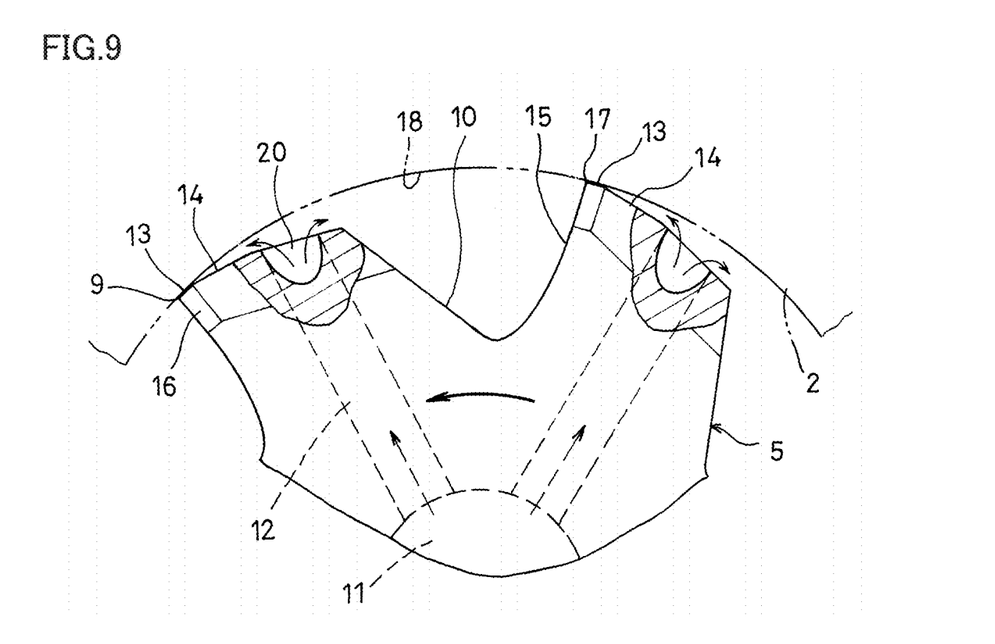
FIG. 9 is a partial sectional view of a modification in which a position of the oil hole shown in FIG. 8 is changed to be fitted in a plane of an outer-circumference flank face.

In reamer 1, since oil outlet 20 of oil hole 12 is open across outer-circumference flank face 14 and the inner surface of groove 10, the space defined between oil outlet 20 of oil hole 12 and the inner surface of hole 18 of workpiece material 2 is large compared with the case in which oil outlet 20 is open to be fitted in outer-circumference flank face 14 as shown in FIG. 9. Consequently, a sufficient amount of cutting oil can be discharged through oil outlet 20 of oil hole 12, particularly effectively lubricating and cooling corner 17 at which tip cutting edge 9 intersects outer-circumference cutting edge 8.

When a straight edge extending parallel to the axis of tool main body 5 or a right-hand helical edge which is twisted at an angle of more than 0° and 10° or less (preferably 2° or more and 8° or less, more preferably 3° or more and 7° or less) clockwise from the axial back to the axial front is employed as outer-circumference cutting edge 8, the cutting resistance of pilot hole 3 of workpiece material 2 can be minimized, so that the inner circumference of pilot hole 3 can be finished at a particularly high degree of accuracy.

As a relatively large back taper that has an outer diameter changing at a rate of 0.05 mm or more (preferably 0.06 mm or more) per axial length of 100 mm from the axial front toward the axial back is provided to margin 13 as in the above embodiment, heat generation caused by the contact between reamer 1 and workpiece material 2 can be reduced when high-feed machining is performed in reamer 1. This can prevent the generation of a return mark due to thermal contraction of workpiece material 2 after the machining (a spiral scratch generated on the inner surface of hole 18 which is caused by the interference of reamer 1 with the inner circumference of hole 18 when reamer 1 is pulled out of hole 18) or damage to reamer 1.

Although the above embodiment has described, by way of example, the reamer in which oil hole 12 formed such that oil outlet 20 is open across outer-circumference flank face 14 and the inner surface of groove 10 as shown in FIG. 8, as shown in FIG. 9, oil hole 12 may be formed at a position at which oil outlet 20 is fitted in the plane of outer-circumference flank face 14.

Figure 7:
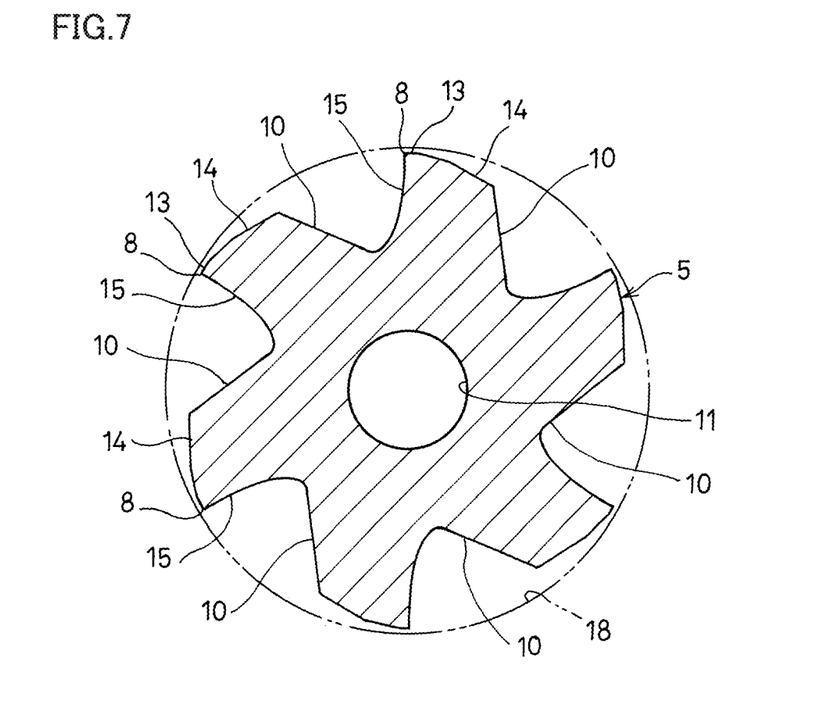
FIG. 7 is a sectional view taken along the line VII-VII of FIG. 1.
Figure 10:
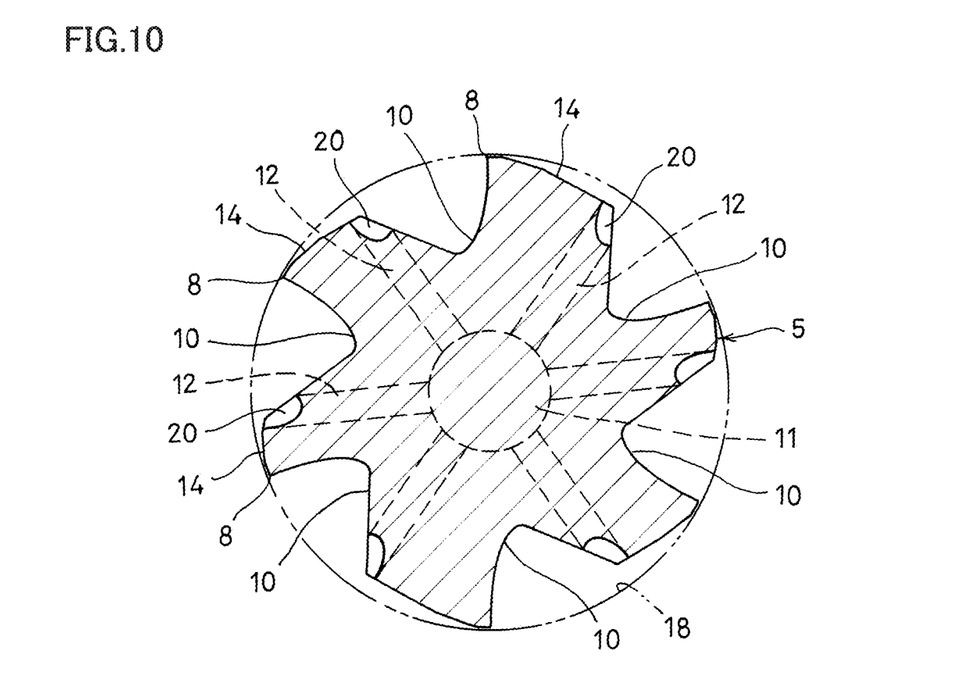
FIG. 10 shows a modification in which circumferential intervals between grooves shown in FIG. 6 are changed to unequal intervals.

Grooves 10 may be provided circumferentially at regular intervals as shown in FIGS. 6 and 7, and may be provided at irregular intervals as shown in FIG. 10. As grooves 10 are provided circumferentially at irregular intervals as shown in FIG. 10, the circularity of hole 18 of workpiece material 2 can be improved.

Although outer-circumference flank face 14 is formed of second flank face 14a and third flank face 14b having different outer-circumference relief angles for enhanced rigidity of the cutting edge portion of reamer 1 in the above embodiment, outer-circumference flank face 14 can be formed of a single plane. Similarly, although tip flank face 16 is formed of tip second face 16a and tip third face 16b having different tip relief angles (chamfer relief angles) in the present embodiment, tip flank face 16 can be formed of a single plane.

In order to confirm that the inner circumference of the pilot hole can be finished at a high degree of accuracy when high-feed machining is performed with the oil hole reamer of the embodiment of the present disclosure, a sample oil hole reamer of an example and a sample oil hole reamer of a comparative example were prepared, and the inner circumference of the pilot hole of the workpiece material was finished through cutting with the sample oil hole reamers. Then, a test was conducted to measure circularity (μm), cylindricity (μm), arithmetic mean roughness Ra (μm), and maximum height roughness Rz (μm) of the inner surface of the hole after the machining. The sample oil hole reamer of the example and the sample oil hole reamer of the comparative example differ from each other only in the position of the oil hole and are identical to each other in the other specifications.

The specifications of the samples are as follows.
<Specifications Different Between Example and Comparative Example>
(1) Position of Oil Hole
  Example: the oil outlet of the oil hole is open across the outer-circumference flank face and the inner surface of the groove.
  Comparative example: the oil outlet of the oil hole is open to the groove bottom surface of the groove.

<Common Specifications Between Example and Comparative Example>
(2) Specifications of Tool
  Diameter of cutting edge: 12 mm
  Length of cutting edge: 19 mm
  Overall length: 130 mm
  Material of reamer: cemented carbide
  Shape of groove: right-hand helix of 5°
  Interval between grooves: unequally divided (0°, 50°, 120°, 180°, 230°, 300°)
(3) Specifications of Workpiece Material
  Material: S50C
  Thickness: 30 mm
  Pilot hole: φ11.8 mm
(4) Machine Used
  Machine tool: ROBODRILL of FANUC (model α-T14iFLa)
  Chuck: BBT30, center-through coolant
  Cutting fluid: semi-emulsion diluted by 20 times (5%)

Test results are shown below. Table 1 shows measurement results of machining on the condition of a cutting speed of 80 (m/min) and a feed rate of 0.6 (mm/rotation), Table 2 shows measurement results of machining on the condition of a cutting speed of 100 (m/min) and a feed rate of 1.2 (mm/rotation), and Table 3 shows measurement results of machining on the condition of a cutting speed of 150 (m/min) and a feed rate of 1.0 (mm/rotation).

TABLE 1

|  | Circularity | Cylindricity | Ra | Rz |
| --- | --- | --- | --- | --- |
| Example | 0.83 | 1.87 | 0.13 | 1.25 |
| Comparative Example | 1.25 | 1.87 | 0.58 | 3.53 |

TABLE 2

|  | Circularity | Cylindricity | Ra | Rz |
| --- | --- | --- | --- | --- |
| Example | 1.45 | 2.82 | 0.17 | 1.35 |
| Comparative Example | 3.57 | 4.07 | 0.56 | 2.94 |

TABLE 3

|  | Circularity | Cylindricity | Ra | Rz |
| --- | --- | --- | --- | --- |
| Example | 1.58 | 4.94 | 0.11 | 0.74 |
| Comparative Example | 2.26 | 8.63 | 0.26 | 2.03 |

These test results confirm that when high-feed machining is performed with an oil hole reamer, the inner circumference of a pilot hole can be finished with a higher degree of accuracy in the example in which an oil hole is open to the outer-circumference flank face than in the comparative example in which an oil hole is open to the groove bottom surface of the groove.

Although a reamer in which an oil outlet of an oil hole was open across an outer-circumference flank face and an inner surface of a groove was used in the example, it was confirmed that a reamer in which an oil outlet of an oil hole was open to be fitted in the plane of an outer-circumference flank face successfully finished the inner circumference of a pilot hole with a high degree of accuracy compared with the comparative example in which an oil hole was open to the groove bottom surface of the groove.

It should be construed that the embodiments and examples disclosed herein have been presented for the purpose of illustration and non-restrictive in every respect. It is therefore intended that the scope of the present invention is defined by claims, not only by the embodiments described above, and encompasses all modifications and variations equivalent in meaning and scope to the claims.

REFERENCE SIGNS LIST 1 reamer, 2 workpiece material, 3 pilot hole, 4 shank, 5 tool main body, 6 cutting edge portion, 7 neck portion, 8 outer-circumference cutting edge, 9 tip cutting edge, 10 groove, 11 oil passage, 12 oil hole, 13 margin, 14 outer-circumference flank face, 14a second flank face, 14b third flank face, 15 rake face, 16 tip flank face, 16a tip second face, 16b tip third face, 17 corner, 18 hole, 20 oil outlet, 21 position concyclic with corner, 50 tip cutting edge, 51 outer-circumference cutting edge, 52 corner, 53 rake face, 54 groove, 55 workpiece material, 56 hole, 57 oil hole, θa second relief angle, θb third flank angle.

The invention claimed is:

1. An oil hole reamer comprising:
a tool main body that rotates about an axis;
a groove extending axially on an outer circumference of the tool main body to an axially front end of the tool main body;
a margin formed on the outer circumference of the tool main body while being adjacent to a tool-rotation-direction back side of the groove;
an outer-circumference flank face formed on the outer circumference of the tool main body while being adjacent to a tool-rotation-direction back side of the margin, the outer-circumference flank face having a smaller diameter at a tool-rotation-direction back than at a tool-rotation-direction front;
an outer-circumference cutting edge formed at an intersecting ridge between the margin and the groove;
a tip flank face formed adjacent to an axially front side of the margin and having a smaller diameter at an axial front than at an axial back;
a tip cutting edge formed at an intersecting ridge between the tip flank face and the groove and connected with an axially front end of the outer-circumference cutting edge;
an oil passage extending along the axis of the tool main body inside the tool main body; and
an oil hole extending radially outward from the oil passage to the outer circumference of the tool main body,
wherein an oil outlet of the oil hole is formed to be open toward a position corresponding to a corner at which the tip cutting edge intersects the outer-circumference cutting edge and to cause at least part of the oil outlet to be open to the outer-circumference flank face,
wherein the oil outlet is open across the outer-circumference flank face and an inner surface of the groove,
wherein a tool-rotation-direction back portion of the outer-circumference flank face and a tool-rotation-direction front portion of the inner surface of the groove form a projecting ridgeline that projects radially outwardly, and
wherein the oil hole is open on the projecting ridgeline.

2. The oil hole reamer according to claim 1, wherein the oil hole is a hole extending obliquely to a direction perpendicular to the axis inside the tool main body.

3. The oil hole reamer according to claim 1, wherein the outer-circumference cutting edge is a straight edge extending parallel to the axis of the tool main body or a right-hand helical edge twisted at an angle of 10° or less clockwise from an axial back to an axial front.

4. An oil hole reamer comprising:
a tool main body that rotates about an axis;
a groove extending axially on an outer circumference of the tool main body to an axially front end of the tool main body;
a margin formed on the outer circumference of the tool main body while being adjacent to a tool-rotation-direction back side of the groove;
an outer-circumference flank face formed on the outer circumference of the tool main body while being adjacent to a tool-rotation-direction back side of the margin, the outer-circumference flank face having a smaller diameter at a tool-rotation-direction back than at a tool-rotation-direction front;
an outer-circumference cutting edge formed at an intersecting ridge between the margin and the groove;
a tip flank face formed adjacent to an axially front side of the margin and having a smaller diameter at an axial front than at an axial back;
a tip cutting edge formed at an intersecting ridge between the tip flank face and the groove and connected with an axially front end of the outer-circumference cutting edge;
an oil passage extending along the axis of the tool main body inside the tool main body; and
an oil hole extending radially outward from the oil passage to the outer circumference of the tool main body, wherein
an oil outlet of the oil hole is open toward a position corresponding to a corner at which the tip cutting edge intersects the outer-circumference cutting edge, and at least part of the oil outlet is open to the outer-circumference flank face,
the oil hole is a hole extending obliquely to a direction perpendicular to the axis inside the tool main body,
the oil outlet is open across the outer-circumference flank face and an inner surface of the groove,
a tool-rotation-direction back portion of the outer-circumference flank face and a tool-rotation-direction front portion of the inner surface of the groove form a projecting ridgeline that projects radially outwardly,
the oil hole is open on the projecting ridgeline, and
the outer-circumference cutting edge is a straight edge extending parallel to the axis of the tool main body or a right-hand helical edge twisted at an angle of 10° or less clockwise from an axial back to an axial front.

* * * * *